US007139029B2

(12) United States Patent
Holland et al.

(10) Patent No.: US 7,139,029 B2
(45) Date of Patent: Nov. 21, 2006

(54) METHODS AND APPARATUS FOR CORRECTION FOR 2-3 FIELD PATTERNS

(75) Inventors: David E. Holland, Granada Hills, CA (US); Gavin W. Schutz, Glendale, CA (US); Merle C. Sharp, Los Angeles, CA (US)

(73) Assignee: Ascent Media Group, Inc., Santa Monica, CA (US)

(*) Notice: Subject to any disclaimer, the term of this patent is extended or adjusted under 35 U.S.C. 154(b) by 423 days.

(21) Appl. No.: 10/430,608

(22) Filed: May 5, 2003

(65) Prior Publication Data

US 2003/0193614 A1 Oct. 16, 2003

Related U.S. Application Data

(63) Continuation of application No. 09/295,936, filed on Apr. 21, 1999, now Pat. No. 6,559,890.

(51) Int. Cl.
*H04N 7/01* (2006.01)
*H04N 11/20* (2006.01)

(52) U.S. Cl. .................. 348/441; 348/700; 348/701

(58) Field of Classification Search ................ 348/441, 348/445, 452, 458, 607, 700–701; H04N 7/01, H04N 11/20
See application file for complete search history.

(56) References Cited

U.S. PATENT DOCUMENTS

| | | | | |
|---|---|---|---|---|
| 4,881,125 A | * | 11/1989 | Krause | 348/448 |
| 5,317,398 A | * | 5/1994 | Casavant et al. | 348/570 |
| 5,329,309 A | * | 7/1994 | Dorricott et al. | 348/97 |
| 5,337,154 A | | 8/1994 | Dorricott et al. | |
| 5,446,497 A | | 8/1995 | Keating et al. | |
| 5,517,248 A | | 5/1996 | Isoda | |

(Continued)

*Primary Examiner*—Brian P. Yenke
(74) *Attorney, Agent, or Firm*—O'Melveny & Myers LLP

(57) ABSTRACT

Systems and methods are provided for allowing a user to correct a discontinuous 2-3 field sequence within a disrupted video signal. A 2-3 field pattern fixer can be operated in a one-pass mode and/or a two-pass mode. In the one-pass mode, the disrupted video signal is analyzed to generate correction information, which is used to correct the disrupted video signal as it passes through the 2-3 pattern fixer, resulting in an undisrupted video signal with a continuous 2-3 field sequence. In the two-pass mode, the disrupted video signal is analyzed to generate correction information, which is then stored. This correction information is then used to correct a duplicate of the disrupted video signal, resulting in an undisrupted video signal with a continuous 2-3 field sequence. In this connection, the 2-3 field pattern fixer includes a field sequence detector, a field sequence analyzer, a field sequence generator and a multiple delay tap circuit. The field sequence detector generates field difference values in response to receiving the disrupted video signal. The field sequence analyzer analyzes these field difference values to determine one or more discontinuities within the discontinuous 2-3 field sequence. The field sequence generator generates one or more field sequence correction signals in response to this analysis. The multiple delay tap circuit applies these correction signals to a video signal to generate an undisrupted video signal having a continuous 2-3 field sequence. The 2-3 field pattern fixer can optionally includes a First-In-First-Out (FIFO) memory and a time code comparator, which can be used to store a multitude of the correction signals during the first pass of the two-pass mode, and for synchronizing the application of each of the correction signals to the duplicated disrupted video signal during the second pass of the two-pass mode.

38 Claims, 3 Drawing Sheets

U.S. PATENT DOCUMENTS

| | | |
|---|---|---|
| 5,689,301 A | 11/1997 | Christopher et al. |
| 5,734,419 A | 3/1998 | Botsford, III et al. |
| 5,771,357 A | 6/1998 | Kato et al. |
| 5,828,786 A | 10/1998 | Rao et al. |
| 5,872,600 A | 2/1999 | Suzuki |
| 5,929,902 A | 7/1999 | Kwok |
| 5,982,444 A | 11/1999 | Kato et al. |
| 6,201,577 B1 | 3/2001 | Swartz |
| 6,542,198 B1 * | 4/2003 | Hung et al. .................. 348/459 |
| 6,633,344 B1 * | 10/2003 | Worrell et al. .............. 348/714 |
| 6,670,996 B1 * | 12/2003 | Jiang .......................... 348/558 |
| 6,859,237 B1 * | 2/2005 | Swartz ........................ 348/700 |
| 2004/0071211 A1 * | 4/2004 | Washino ................ 375/240.01 |

* cited by examiner

| FIELD # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|---|
| DSCON SEQ | A1 | A2 | B1 | B2 | B1 | C2 | C1 | D2 | D1 | D2 | E1 | E2 | F1 | F2 | F1 | G2 | G1 | H2 | H1 | M1 | M1 | N2 | N1 | N2 | O1 | O2 | P1 | P2 | P1 | Q2 | Q1 | R2 | R1 | R2 | S1 | S2 | T1 | T2 | T1 |
| CON SEQ #1 | A1 | A2 | B1 | B2 | B1 | C2 | C1 | D2 | D1 | D2 | E1 | E2 | F1 | F2 | F1 | G2 | G1 | H2 | H1 | H2 | M1 | M2 | N1 | N2 | O1 | O2 | P1 | P2 | P1 | Q2 | Q1 | R2 | R1 | R2 | S1 | S2 | T1 | T2 | T1 |
| DELAY #1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| CON SEQ #2 | A1 | A2 | B1 | B2 | B1 | C2 | C1 | D2 | D1 | D2 | E1 | E2 | F1 | F2 | F1 | G2 | G1 | H2 | H1 | H2 | N1 | N2 | O1 | O2 | P1 | P2 | Q1 | Q2 | R1 | R2 | S1 | S2 | T1 | T2 | T1 | | | | |
| DELAY #2 | 0 | 0 | 0 | 0 | 0 | 0 | 0 | 0 | 0 | 0 | 0 | 0 | 0 | 0 | 0 | 0 | 0 | 0 | 0 | 0 | -2 | -2 | -2 | -2 | -2 | -2 | -2 | -2 | -2 | -2 | -2 | -2 | -2 | -2 | -2 | 0 | 0 | 0 | 0 |

2 - 3 FIELD SEQUENCE

FIELD DIFFERENCE VALUES

METHODS AND APPARATUS FOR CORRECTION FOR 2-3 FIELD PATTERNS

RELATED APPLICATIONS

This application is a continuation of Ser. No. 09/295,936, filed Apr. 21, 1999, now issued as U.S. Pat. No. 6,559,890, incorporated herein by reference.

FIELD OF THE INVENTION

This invention relates to methods and systems for processing videotape, and more particularly to correcting a discontinuous 2-3 field pattern that resides on the videotape.

BACKGROUND OF THE INVENTION

In general, telecine machines that operate at 60 field/sec (actually, 59.94 fields/sec) employ a 3:2 pulldown convention to convert film media, which runs at 24 frame/sec (actually, 23.976/sec), to video media, which runs at 60 television field/sec (actually, 59.94 fields/sec). Specifically, a two-field video sequence and a three-field video sequence are alternately generated, with each field sequence corresponding to a film frame. These video fields are interlaced in that the film frames are scanned, such that alternating odd and even fields are generated, with the lines of the odd fields interleaved with the lines of the even fields. For example, a film frame can be scanned to generate a two-field video sequence characterized by an even field and then an odd field (even/odd). The next film frame can be scanned to generate a three-field video sequence characterized by an even field, then an odd field, and then an even field (even/odd/even). The respective first and second even fields in this three-field video sequence are duplicates. The next film frame can be scanned to generate a two-field video sequence characterized by an odd field and then an even field (odd/even). The next film frame can be scanned to generate a three-field video sequence characterized by an odd field, then an even field, and then an odd field (odd/even/odd). The respective first and second odd fields in this three-field video sequence are duplicates. This pattern then repeats for the next four film frames and so on.

The two/three-field video sequence is sometimes disrupted, such as, e.g., when the video is edited without regard to the video sequence. These disruptions in the video sequence can cause difficulties during processing that requires manipulation of the two/three-field sequence. For example, it is sometimes desired to convert 525 line, 60 fields/sec video to 625 line, 48 fields/sec video. During this procedure, the two/three-field video sequence is converted to a repeating two-field video sequence by removing the duplicate field from each of the three-field video sequences, and, if needed, swapping the order of the two-field video sequence, thereby generating a repeating two-field video sequence characterized by an even field and then an odd field through the entirety of the video (even/odd), or alternatively, an odd field and then an even field through the entirety of the video (odd/even). The 525 line resolution of the 525 line, 60 field/sec video is then interpolated to produce the 625 line, 48 field/sec video with 625 lines of resolution. The resulting 625 line, 48 field/sec video is recorded at 24 frames/sec, which is then played at 25 frames/sec, which is the normal 625 line, 50 field/sec video when viewed. When there is a disruption in the two/three-field video sequence prior to conversion, the two-field sequence subsequent to conversion will sometimes change dominance. That is, the repeating odd/even video sequence changes to a repeating even/odd video sequence. Because a television system cannot process an odd/odd video sequence (or an even/even video sequence), an even field (or odd field) by itself, or an even/odd/even video sequence (or an odd/even/odd video sequence) must be located at the change in dominance. As a result, the video is degraded.

Another example of a process that requires the manipulation of the two/three-field video sequence is the conversion of video to a digital video disk (DVD). To save memory, the two/three field video sequence is converted to a repeating two-field video sequence in much the same manner described above. The two-field video sequence is then compressed into a motion pictures expert group (MPEG2) format. The DVD player then restores the two/three-field video sequence during playback on the television system. Again, however, during conversion, the field dominance of the two-field video sequence may change, thereby degrading the DVD.

Thus, it would be desirable to provide methods and systems to correct a disrupted two/three-field video sequence.

SUMMARY OF THE INVENTION

This present invention comprises novel methods and systems for correcting a discontinuous 2-3 field sequence within a disrupted video signal. A 2-3 pattern fixer constructed in accordance with the present invention can be operated in a one-pass mode and/or a two-pass mode. In a one-pass mode, the disrupted video signal is analyzed to generate correction information, which is used to correct the disrupted video signal as it passes through the 2-3 pattern fixer, preferably in real time, resulting in an undisrupted video signal with a continuous 2-3 field sequence. In a two-pass mode, the disrupted video signal is analyzed to generate correction information, which is then stored. This correction information is then used to correct a duplicate of the disrupted video signal, resulting in an undisrupted video signal with a continuous 2-3 field sequence.

In a preferred embodiment of the present invention, a 2-3 field pattern fixer includes a field sequence detector, a field sequence analyzer, a field sequence generator and a multiple delay tap circuit. The field sequence detector receives the disrupted video signal and generates a series of field difference values in response thereto by sequentially comparing each of the fields with a field two fields previous. The field sequence analyzer analyzes the series of field difference values and generates field sequence to determine one or more discontinuities within the 2-3 field sequence of the disrupted video signal. The field sequence generator uses this information to generate field sequence reorganization information in the form of a correction signal. In the preferred embodiment, the correction signal comprises a sequence of delays. The correction signal is preferably generated, such that a cumulative delay within the undisrupted video signal is minimized and the number of odd field delays are minimized. The multiple delay tap circuit then applies the correction signal to a video signal to generate an undisrupted video signal having a continuous 2-3 field sequence. That is, selected fields of the disrupted video signal or duplicate of the disrupted video signal are delayed in accordance with the correction signal, thereby resulting in the undisrupted video signal. The multiple delay tap circuit can optionally include at least one cross-fader to cross-fade between an odd-delayed field and an even-delayed field, thereby minimizing any blur caused by odd field delays.

This particular embodiment of the 2-3 field pattern fixer can be operated in the one-pass mode. In this connection, the disrupted video signal is analyzed to determine one or more discontinuities with the discontinuous 2-3 field sequence. The discontinuities can be determined by detecting a scene change and a phase change within the 2-3 field sequence. Field sequence reorganization information, and in particular, correction signals are then generated based on these discontinuities. These correction signals are then applied to the disrupted video signal as it passes through the 2-3 field pattern fixer, thereby generating an undisrupted video signal having a continuous 2-3 field sequence from the disrupted video signal.

The 2-3 field pattern fixer can optionally include a first-in-first-out (FIFO) memory and a time code comparator, allowing the 2-3 field pattern fixer to operate in a two-pass mode. The FIFO is coupled between the field sequence generator and the multiple tap delay circuit and can store several correction signals. The time code comparator is operatively coupled to the FIFO and the multiple delay tap circuit to coordinate the timing of the correction signals as they are input into the multiple delay tap circuit. The time code comparator receives at a first input a current time code of the duplicated disrupted video signal, and at a second input, a trigger time code generated in the field sequence generator and stored in the FIFO. The trigger time code corresponds with the time code during which the next correction signal in the FIFO will be initially applied to the duplicated disrupted video signal. In response thereto, the time code comparator generates a trigger signal that is input into the FIFO and the multiple delay tap circuit.

In the two-pass mode, the disrupted video signal is analyzed during the first pass to determine one or more discontinuities with the discontinuous 2-3 field sequence. Field sequence reorganization information, and in particular, correction signals and corresponding trigger time codes are then generated based on the discontinuities and associated time codes. These correction signals and corresponding trigger time codes are stored in the FIFO. During the second pass, the duplicated disrupted video signal is received by the multiple tap delay circuit. When the current time code of the duplicated disrupted video signal and the first trigger time code match, the time code comparator sends a trigger signal to the multiple delay tap circuit to begin applying the correction signal to the duplicated disrupted video signal. The trigger signal is also sent to the FIFO to advance the next correction signal for subsequent use by the multiple delay tap circuit, and the next trigger time code to the time code comparator. When the current time code of the duplicated disrupted video signal matches the next trigger time code, the time comparator again sends a trigger signal to the multiple delay tap circuit to begin applying the next correction signal. This process is then repeated until the last correction signal in the FIFO has been applied to the duplicate disrupted video signal. Each of the correction signals are preferably applied to the duplicated disrupted video signal at a field rate equal to the field rate of the disrupted video signal.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which:

FIG. 2 is table showing the derivation of first and second continuous 2-3 field sequences from a discontinuous 2-3 field sequence by respectively employing two correction signals;

FIG. 3 is a plot of field difference values generated from each of the fields of the discontinuous 2-3 field sequence depicted in FIG. 2, wherein the phase and edit point of the discontinuous 2-3 field sequence are particularly indicated by the field difference values.

DETAILED DESCRIPTION OF THE INVENTION

Figure 1:
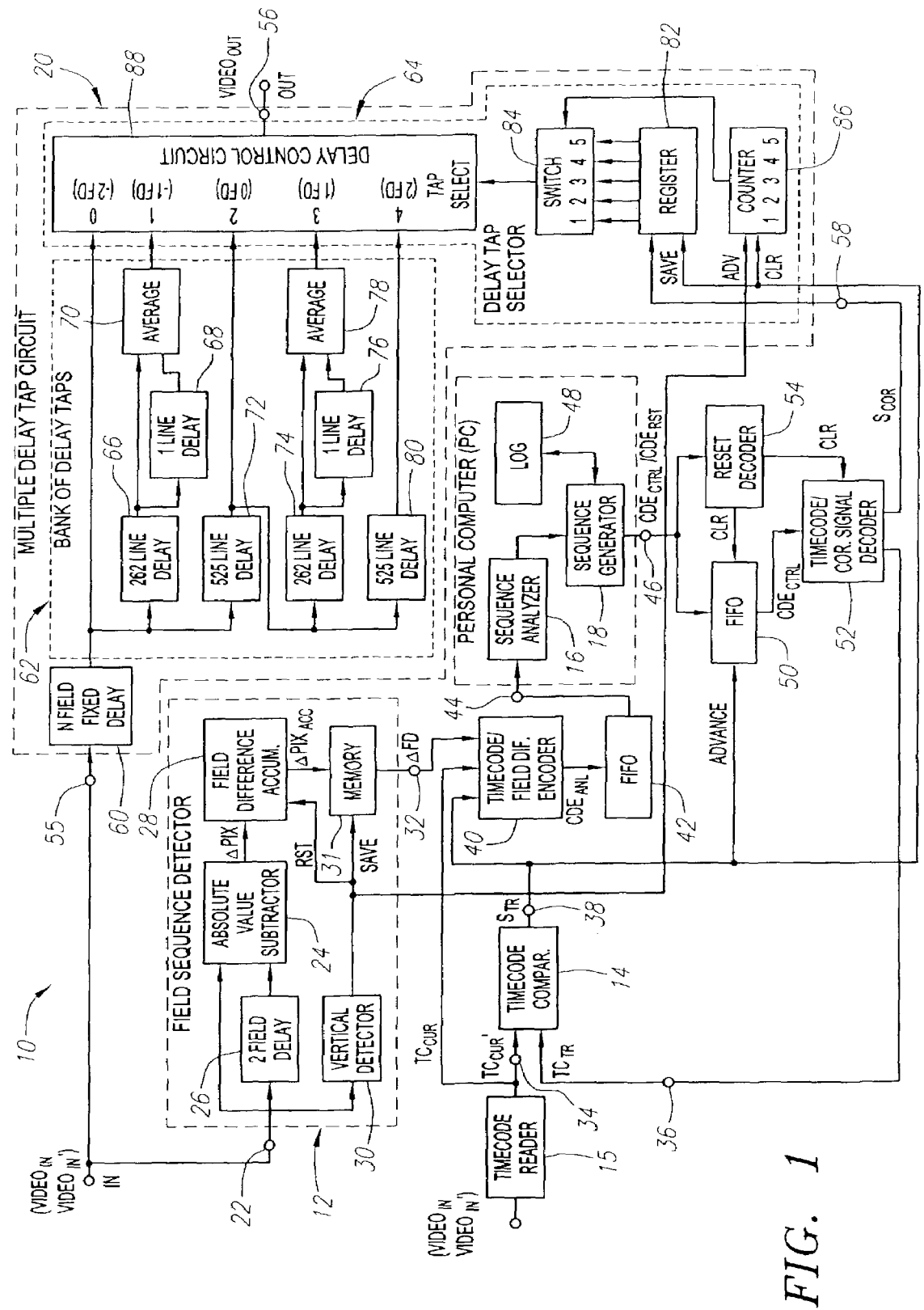
FIG. 1 is a block diagram of a preferred embodiment of a 2-3 field pattern fixer constructed in accordance with the present invention.

FIG. 1 shows a schematic representation of a 2-3 field pattern fixer 10, which is configured to receive, at an input IN, a disrupted video signal $VIDEO_{IN}$ having a series of fields arranged in a discontinuous 2-3 field sequence, i.e., a 2-3 field sequence having at least one discontinuity, and transmit, at an output OUT, an undisrupted video signal $VIDEO_{OUT}$ having a series of fields arranged in a continuous 2-3 field sequence, i.e., a 2-3 field sequence having no discontinuities. The 2-3 field pattern fixer 10 is configured to selectively operate in either a one-pass mode or a two-pass mode. In the one pass mode, the 2-3 field pattern fixer 10 analyzes the disrupted video signal $VIDEO_{IN}$ and generates, based on the results of this analysis, the undisrupted video signal $VIDEO_{OUT}$ from the disrupted video signal $VIDEO_{IN}$ as the analysis is being performed. The 2-3 field pattern fixer 10 is configured, such that the disrupted video signal $VIDEO_{IN}$ is corrected in real time. In the two-pass mode, the 2-3 field pattern fixer 10 analyzes several scenes of the disrupted video signal $VIDEO_{IN}$, and stores the results of the analysis (first pass). Based on the stored results of the analysis, the undisrupted video signal $VIDEO_{OUT}$ is then generated from a duplicated video signal $VIDEO_{IN}'$ (second pass). The 2-3 field pattern fixer 10 is configured, such that the disrupted video signal $VIDEO_{IN}$ is corrected in real time during the second pass. In this connection, the 2-3 field pattern fixer 10 generally includes a field sequence detector 12, a time code comparator 14, a field sequence analyzer 16, a field sequence generator 18, and a multiple delay tap circuit 20, the arrangement of which will be described in further detail below.

The field sequence detector 12 detects the discontinuous 2-3 field sequence within the disrupted video signal $VIDEO_{IN}$, which is serially fed into the input IN, and generates a field difference value ΔFD in response thereto indicative of the detected 2-3 field sequence. In this connection, the field sequence detector 12 includes an input 22 on which the disrupted video signal $VIDEO_{IN}$ is received. The field sequence detector 12 further includes an absolute value subtractor 24, one input of which is directly coupled to the input 22 and the other input of which is coupled to the input 22 through a two-field delay 26. Preferably, the two-field delay 26 is implemented using a random access memory (RAM), which can be used to respectively write the serial bits of the video signal to and read the serial bits of the video signal from. It should be noted however, that any circuit that generates a two-field delay can be employed without straying from the principles of this invention. The absolute value subtractor 24 subtracts the pixel values within the current field from the pixel values within a field twice removed in sequence from the current field, and outputs an absolute, unsigned pixel difference value ΔPIX in response thereto.

The field sequence detector 12 further includes a field accumulator 28, a vertical detector 30 and a memory device 31. The field accumulator 28 is coupled to the absolute value subtractor 24 and accumulates the pixel difference values ΔPIX as they are output from the absolute value subtractor 24. The field accumulator 28 then generates and outputs an accumulated pixel difference value $\Delta PIX_{ACC}$. The memory device 31 is coupled to the field accumulator 28 and stores the accumulated pixel difference value $\Delta PIX_{ACC}$ as it is output from the field accumulator 28. The vertical detector 30 is coupled to the input 22 and detects a vertical synchronization signal within the disrupted video signal $VIDEO_{IN}$, and thus the beginning of the next field. Upon detection of the vertical synchronization signal, the vertical detector 30 simultaneously sends a reset signal RST to the field accumulator 28 to reset the accumulated pixel difference value $\Delta PIX_{ACC}$ to 0, and a save signal SAVE to the memory device 31 to save the accumulated pixel difference value $\Delta PIX_{ACC}$, which is then output on an output 32 as the field difference value ΔFD. This process is repeated for each field of the disrupted video signal $VIDEO_{IN}$. As will be discussed in further detail below, the field difference value ΔFD is indicative of the 2-3 field sequence, namely, a phase of the 2-3 field sequence and an edit point, i.e., a scene change, within 2-3 field sequence.

The time code comparator 14 is employed when the 2-3 field pattern fixer 10 is in the second pass of the two-pass mode, and synchronizes the fields of the duplicated disrupted video signal $VIDEO_{IN}'$ with the corresponding fields of the disrupted video signal $VIDEO_{IN}$, which was previously analyzed during the first pass. A time code reader 15 converts a vertical interval time code (VITC) incorporated within the disrupted video signal $VIDEO_{IN}$ into a current time code $TC_{CUR}$ or a VITC incorporated within the duplicated disrupted video signal $VIDEO_{IN}$ into a current time code $TC_{CUR}'$. The current time codes $TC_{CUR}$ or $TC_{CUR}'$ are generated in the form of parallel time code data bits. Alternatively, the time code reader 15 can convert a longitudinal time code (LTC), which is sent to the time code reader 15 independently of a video signal, into the current time codes $TC_{CUR}$ or $TC_{CUR}'$. The time code comparator 14 compares the current time code $TC_{CUR}'$ of the duplicated disrupted video signal $VIDEO_{IN}'$, received at a first input 34, and a trigger time code $TC_{TR}$ obtained from a previously analyzed disrupted video signal $VIDEO_{IN}$, received at a second input 36, and outputs a trigger signal $S_{TR}$ at an output 38. In the preferred embodiment, the trigger signal $S_{TR}$ is a two bit signal. When the current time code $TC_{CUR}$ matches the trigger time code $TC_{TR}$, the first bit of the trigger signal $S_{TR}$ is high. When the current time code $TC_{CUR}$ is less than the trigger time code $TC_{TR}$, the first bit of the trigger signal $S_{TR}$ is low. When the current time code $TC_{CUR}$ is greater than the trigger time code $TC_{TR}$, the second bit of the trigger signal $S_{TR}$ is high, indicating an error condition. The operation of the time code comparator 14 and the significance of the trigger signal $S_{TR}$ will be discussed in further detail below.

A time code/field difference encoder 40 is coupled to the output 32 of the field sequence detector 12, the output 38 of the time code comparator 14 and the current time code $TC_{CUR}$. The time code/field difference encoder 40 encodes the current time code $TC_{CUR}$ (or $TC_{CUR}'$), trigger signal $S_{TR}$, and field difference value ΔFD into an encoded character string $CDE_{ANL}$ for use by the field sequence analyzer 16. An exemplary format for the character string $CDE_{ANL}$ is <AA: BB:CC:DD:E>GGGGGG/CR/LF/. AA:BB:CC:DD:E is encoded from the current time code $TC_{CUR}$, with AA representing hours, BB representing minutes, CC representing seconds, DD representing video frame number between 0 and 29, and E representing even or odd field. The ">" sign is encoded from the two bits of the trigger signal $S_{TR}$, and changes to an "=" sign if the current time code $TC_{CUR}$ equals the trigger time code $TC_{TR}$, or an "?" sign if the current time code $TC_{CUR}$ is greater than the trigger time code $TC_{TR}$. GGGGGG indicates the field difference value ΔFD. CR represents a carriage return, and LF represents line feed. The character string $CDE_{ANL}$ is input into a First-In-First-Out (FIFO) memory 42, where several character strings $CDE_{ANL}$ can be stored. The FIFO 42 allows the field sequence analyzer 16 and field sequence generator 18 to utilize the character strings $CDE_{ANL}$ in non-real time. This is especially important if the field sequence analyzer 16 and field sequence generator 18 are embodied in a personal computer (PC), which typically does not read its serial port immediately.

The field sequence analyzer 16 decodes and analyzes the field difference values ΔFD encoded in the character strings $CDE_{ANL}$, which are used to determine the 2-3 field sequence of the disrupted video signal $VIDEO_{IN}$. The field sequence generator 18 generates field sequence reorganization information in the form of a field sequence correction signal $S_{COR}$ and a trigger time code $TC_{TR}$, which are encoded in a character string $CDE_{CTRL}$. As will be discussed in further detail below, the trigger time code $TC_{TR}$ corresponds to the particular field of the duplicated disrupted video signal $VIDEO_{IN}'$ to which the field sequence correction signal will be applied during the second pass in a two-pass mode. Preferably, the field sequence analyzer 16 and field sequence generator 18 are embodied in a standard personal computer (PC). It should be noted, however, that the field sequence analyzer 16 and field sequence generator 18 can be embodied in logic circuitry without straying from the principles of this invention. The PC includes an RS232 serial input port 44, which is coupled to the FIFO 42, and an RS232 serial output port 46.

The field sequence analyzer 16 particularly analyzes the field difference values ΔFD to determine the phase of the discontinuous 2-3 field sequence and any edit point within the 2-3 field sequence. For instance, FIG. 2 depicts an exemplary discontinuous 2-3 field sequence having alternating distinct two-field sequences 2FS and distinct three-field sequences 3FS. The reference letters A, B, C, D, etc., respectively designate the film frames from which the fields are derived. The reference numbers 1 and 2 respectively designate field 1 and field 2 (odd and even, or even and odd). As is apparent, a discontinuity in the form of an edit point EP (or scene change) has been generated between field H2 and field M1, causing, in this case, a change in the phase of the 2-3 field sequence. The field difference values ΔFD output from the field sequence detector 12 are indicative of the first field of a scene change, as well as the third field of a distinct three-field sequence. That is, a comparison of the first two fields immediately subsequent to a scene change with the first two fields previous to each will result in a relatively large field difference value ΔFD for two fields. On the contrary, a comparison of the third and first fields of a distinct three field sequence 3FS will result in a relatively low field difference value ΔFD. If the disrupted video signal $VIDEO_{IN}$ is generated from a telecine digital recording that repeats the third field of the three field frame from digital memory, the field difference value ΔFD may actually be zero. Comparison of a field that is not the first field of a scene change or the third field of a distinct three-field sequence 3FS will result in a nominal field difference value ΔFD providing a reference for determination of the first field of a scene change and the third field of a distinct three-field sequence 3FS.

FIG. 3 shows a sequence of field difference values ΔFD output from the field sequence detector 12 as each field of the 2-3 field sequence depicted in FIG. 2 is detected. As can be seen, a high field difference value ΔFD is output from the field sequence detector 12 at field 21 (M1) indicating field M1 as the first field of a scene change. A low field difference value ΔFD is output from the field sequence detector 12 at fields 5 (B1), 10(D2), 15(F1), 20(H2), 24(N2), 29(P1), 34(R2), 39(T1), etc., indicating the third field of each of the distinct three-field sequences, which repeats every five fields up until field 24(N2), and then repeats every five fields thereafter.

The field sequence analyzer 16 analyzes the sequence of field difference values ΔFD to determine the first field of the scene change and the change in the phase of the 2-3 field sequence. To determine a phase change within the 2-3 field sequence, the field sequence analyzer 16 correlates the third field of every three-field sequence 3FS to the current time code $TC_{CUR}$. The field sequence analyzer 16 first converts the current time code $TC_{CUR}$ to an integer, and then performs a modulo-5 operation on this integer to obtain a repeating time code sequence of 0, 1, 2, 3, 4. The field sequence analyzer 16 then correlates the third field of every three-field sequence 3FS with one of these five integers. In a continuous 2-3 field sequence, every third field of a three-field sequence 3FS will correlate with the same integer, indicating a constant phase through the 2-3 field sequence. When there is a discontinuity within the 2-3 field sequence (typically caused by an edit point), the phase of the 2-3 field sequence will usually be altered. For instance, assuming field 1(A1) in FIG. 2 correlates with the time code integer 0, the phase of the discontinuous 2-3 field sequence correlates with the time code integer 4 (fields 5(B1), 10(D2), 15(F1), 20(H2)) up until the edit point EP. After the edit point EP, the phase of the discontinuous 2-3 field sequence correlates with the time code integer 3 (fields 24(N2), 29(P1), 34(R2), 39(T1)), thus representing a phase change of −1. An edit point that occurs immediately after the third field of a three-field sequence 3FS or the second field of a two field sequence without a phase change will not generate a discontinuity within the 2-3 field sequence. This condition generally occurs 8% of the time. A phase change in the 2-3 field sequence not resulting from an edit point EP indicates an error condition.

Based on the determination of the first field of the scene change and the phase change of the discontinuous 2-3 field sequence, the field sequence generator 18 generates field sequence reorganization information, which can subsequently be applied to either the disrupted video signal $VIDEO_{IN}$ (one-pass mode) or the duplicated disrupted video signal $VIDEO_{IN}'$ (two-pass mode), to generate the undisrupted video signal $VIDEO_{OUT}$. This reorganization information is based on a reorganization of the disrupted 2-3 field sequence internally performed within the field sequence generator 18. In particular, with knowledge of the first field of the scene change and the phase change of the discontinuous 2-3 field sequence obtained from the field sequence analyzer 16, the field sequence generator 18 deletes, repeats and/or swaps fields within the discontinuous 2-3 field sequence to generate the continuous 2-3 field sequence. For instance, a distinct two-field sequence 2FS can be changed to a distinct three-field sequence 3FS by repeating one of the fields. A distinct three-field sequence 3FS can be changed to a distinct two-field sequence 2FS by deleting the first or third field of the distinct three-field sequence 3FS. A distinct two-field sequence 2FS composed of an odd field and then an even field can be changed to a distinct two-field sequence 2FS composed of an even field and then an odd field by swapping fields, and vice versa. A distinct three-field sequence 3FS composed of an even field, then an odd field, and then an even field can be changed to a distinct three-field sequence 3FS composed of an odd field, then an even field, and then an odd field by repeating and deleting fields.

As will be described in further detail below, the field sequence generator 18 performs this reorganization by associating a relative delay for certain of the fields of the discontinuous 2-3 field sequence. This delay information is used to generate a delay sequence for each of the fields of the continuous 2-3 field sequence, beginning with the first field of the scene and ending with the last field of the scene (the scene change location may move a field or two after this process). For instance, the discontinuous 2-3 field sequence of FIG. 2 is shown reconstructed into either a first continuous 2-3 field sequence or a second continuous 2-3 field sequence by assuming a relative delay for certain of the fields of the discontinuous 2-3 field sequence. As is apparent, frame 21(M1) is the first field of the scene change, and the scene change has caused a phase change in the 2-3 field sequence of −1 (i.e., frame 24(N2) is four frames removed from frame 20(D2) instead of five). Based on this, the field sequence generator 18 can determine for certain fields, the delay required to generate a continuous 2-3 field sequence.

For instance, to construct the first continuous 2-3 field sequence, the field sequence generator 18 derives the partial field sequence M1/M2/N1/N2/N1 from the discontinuous 2-3 field sequence by associating a 0 field delay and a 1 field delay with field 21(M1), a 0 field delay and a 2 field delay with field 23(N1), and a 0 field delay with field 24(N2). The field sequence M1/M2/N1/N2/N1 can then be respectively used for fields 21–25. It should be noted that only the fields of the discontinuous 2-3 field sequence required to construct a continuous 2-3 field sequence have a delay associated therewith. For example, a delay is not associated with field 22(N2), which is effectively ignored. Carrying this process throughout the scene will result in a delay sequence of 0, 1, 0, 0, 2, 0, 2, 0, 0, 2, 0, 2 for fields 21–32. As can be seen, a repeating delay sequence of $\overline{0,0,2,0,2}$ occurs after the 1 field delay. Although not depicted, odd field delays can occur at the end of the scene, just like at the beginning of the scene.

To construct the second 2-3 field sequence, the field sequence generator 18 derives the sequence N1/N2/O1/O2/O1 from the discontinuous 2-3 field sequence by associating a −2 field delay with field 23(N1), a 0 field delay with field 22(N2), a −2 field delay and a 0 field delay with field 25(O1), and a −2 field delay for field 26(O2). A delay is not associated with frame 21(M1) and frame 24(N2), which are effectively ignored. Thus, a delay sequence having a repeating delay sequence of $\overline{-2,0,-2,-2,0}$, is generated for fields 21–25, and so on. It should be noted that, in reality, a negative delay cannot be achieved. The negative delays represented in FIG. 2, however, are relative to a fixed delay. For example, if there is a fixed delay of 10 fields, a −2 field delay would actually be an absolute 8 field delay. As will be discussed in further detail below, the field sequence generator 18 generates a delay sequence based on various criteria.

The delay sequence is used to generate a correction signal $S_{COR}$. When the 2-3 pattern fixer 10 is in the two-pass mode, the field sequence correction signal $S_{COR}$ along with the corresponding time code, i.e., the trigger time code $TC_{TR}$, is stored in a log 48 during the first pass of the two-pass mode. For example, the delay sequence 0, 1, $\overline{0,0,2,0,2}$, $\overline{0,0,2,0,2}$, etc. depicted in FIG. 2 with respect to the first continuous 2-3 field sequence will result in a correction signal of 0, 1 and a correction signal of 0, 0, 2, 0, 2. The repeating delay sequence of $\overline{-2,0,-2,-2,0}$ depicted in FIG. 2 with respect to the second continuous 2-3 field sequence will result in a single correction signal of −2, 0, −2, −2, 0. A multitude of correction signals $S_{COR}$ and corresponding trigger time codes $TC_{TR}$ are accumulated over several scenes and stored in the log 48.

The field sequence correction signals $S_{COR}$ and corresponding trigger time codes $TC_{TR}$ are encoded into control character strings $CDE_{CTRL}$ and output on the RS232 serial output port 46. An exemplary format for the character string $CDE_{CTRL}$ is {AA:BB:CC:DD:E}HHHHH/CR/LF/, where AA:BB:CC:DD:E is the trigger time code $TC_{TR}$ with AA representing hours, BB representing minutes, CC representing seconds, DD representing video frame number between 0 and 29, and E representing even or odd field; HHHHH represents the field sequence correction signal $S_{COR}$; CR represents carriage return; and LF represents line feed. The character string $CDE_{CTRL}$ is input into a First-In-First-Out (FIFO) memory 50, where several character strings $CDE_{CTRL}$ can be stored. The FIFO 50 obviates the need for the field sequence analyzer 16 and field sequence generator 18 to respond to each field, eliminating the need of the field sequence analyzer 16 and field sequence generator 18, i.e., the PC, to operate in real time. The output of the time code comparator 14 is coupled to and inputs the trigger signal $S_{TR}$ into the FIFO 50. When the 2-3 field pattern fixer 10 is performing the second pass of the two-pass mode, and when the trigger signal $S_{TR}$ indicates that the current time code $TC_{CUR}$ is equal to the trigger time code $TC_{TR}$ as discussed above, the FIFO 50 outputs the next control character string $CDE_{CTRL}$. When the 2-3 field pattern fixer 10 is in the one-pass mode, the field sequence generator 18 provides the signal to output the control character string $CDE_{CTRL}$.

A time code/correction signal decoder 52 is coupled to the FIFO 50 and receives the next control character string $CDE_{CTRL}$. The time code/correction signal decoder 52 outputs, on a first output, the decoded correction signal $S_{COR}$ for subsequent use by the multiple delay tap circuit 20 and on a second output, the trigger time code $TC_{TR}$ for input into the second input 36 of the time code comparator 14. As will be described in further detail below, application of the trigger time code $TC_{TR}$ to the second input 36 of the time code comparator 36 and subsequent generation of the trigger signal $S_{TR}$ allows the proper correction signal $S_{COR}$ to be applied to the duplicated disrupted video signal $VIDEO_{IN}'$ when the 2-3 pattern fixer 10 is in the two-pass mode.

The field sequence analyzer 16 generates a reset code $CDE_{RST}$ if the current time code $TC_{CUR}$ backs up, i.e., the videotape is rewound. The reset code $CDE_{RST}$ is output when the current time code $TC_{CUR}$ either stops or is forwarded, i.e., the videotape is cued or played. The reset decoder 54 is coupled to the field sequence analyzer 16 and decodes the reset code $CDE_{RST}$ upon reset thereof. The output of the reset decoder 54 is coupled to and clears the FIFO 50 and time code/correction signal decoder 52 in response to the reset code $CDE_{RST}$. The reset code $CDE_{RST}$ allows the field sequence analyzer 16 to clear the control character strings $CDE_{CTRL}$ from the FIFO 50 and input the proper control character strings $CDE_{CTRL}$ when the cleared control character strings $CDE_{CTRL}$ are out of synchronization with the current time code $TC_{CUR}$.

The multiple delay tap circuit 20 includes a first input 55 to receive the disrupted video signal $VIDEO_{IN}$ (or duplicated video signal $VIDEO_{IN}'$) and an output 56 to output the undisrupted video signal $VIDEO_{OUT}$. A second input 58 of the multiple delay tap circuit 20 is coupled to the output of the time code/correction signal decoder 52 to receive the field sequence correction signal $S_{COR}$. The multiple delay tap circuit 20 includes a fixed delay 60, a bank of delay taps 62 and a delay tap selector 64. For the purposes of illustration, the bank of delay taps 62 is shown to include 0, 1, 2, 3, and 4 field delay taps. Each of the fields of the disrupted video signal $VIDEO_{IN}$ or duplicated video signal $VIDEO_{IN}'$ can be relatively delayed within a range of between −2 and 2 fields, as discussed above. Preferably, the fixed delay 60 is several fields in length to provide the field sequence analyzer 16 enough time to analyze the discontinuous 2-3 field sequence of the disrupted video signal $VIDEO_{IN}$ and the field sequence generator 18 enough time to generate the field sequence correction signals $S_{COR}$ in response thereto, when the 2-3 field pattern fixer 10 is in the one-pass mode. Preferably, the fixed delay 60 and delay taps 62 are implemented using a random access memory (RAM). It should be noted that the audio signal (not shown) should be delayed the same number of fields equal to the fixed delay 60 plus the delay of the center tap to facilitate the synchronization of the audio signal and the undisrupted video signal $VIDEO_{OUT}$ when applied to videotape.

The bank of field delay taps 62 include delay taps 0, 1, 2, 3, and 4, which represent alternating even and odd fields of delay, i.e., relative delays of −2, −1, 0, 1, and 2 fields. Delay tap 0 (relative delay of −2 fields) is generated by connecting a direct line between the fixed delay 60 and the delay control circuit 88. Delay tap 1 (relative delay of −1 field) is generated by connecting a 262½-line delay between the fixed delay 60 and the delay control circuit 88. The 262½-line delay is created by averaging, through an averaging circuit 70, a 262 line delay 66 with the 262 line delay 66 in series with a 1-line delay 68. Delay tap 2 (relative delay of 0 fields) is generated by connecting a 525-line delay 72 between the fixed delay 60 and the delay control circuit 88. Delay tap 3 (relative delay of 1 field) is generated by connecting the 525 line delay 72 and 262½ line delay between the fixed delay 60 and the delay control circuit 88. The 262½-line delay is created by averaging, through an averaging circuit 78, a 262 line delay 74 with the 262-line delay 74 in series with a 1-line delay 76. Delay tap 4 (relative delay of 2 fields) is generated by connecting the 525-line delay 72 and a 525-line delay 80 between the fixed delay 60 and the delay control circuit 88. It should be noted that by adjusting the number of lines in each delay appropriately, the 2-3 pattern fixer 10 can be used for other applications, such as, e.g., high definition television (HDTV).

The delay tap selector 64 includes a register 82, a switch 84, a counter 86 and a delay control circuit 88. The register 82 is connected to the second input 58 and stores the field sequence correction signal $S_{COR}$ received on the second input 58 from the time code/correction signal decoder 52. The delay numbers within the field sequence correction signal $S_{COR}$ are respectively output onto five lines leading to five takeoffs on the switch 84. The counter 86, which continuously counts from 1 to 5, is operatively coupled to the switch 84, such that the switch 84 serially outputs the delay numbers of the field sequence correction signal $S_{COR}$. The register 82 and counter 86 each includes an input coupled to the output 38 of the time code comparator 14 to receive the trigger signal $S_{TR}$. When the trigger signal $S_{TR}$ indicates that the current time code $TC_{CUR}$ equals the trigger time code $TC_{TR}$, the register 82 saves the field sequence correction signal $S_{COR}$ output from the time code/correction signal decoder 52 and the counter 86 is reset to 1. The counter 86 is keyed to the beginning of each field. In this regard, the output of the vertical detector 30 is coupled to the counter and sends an advance signal ADV thereto at the beginning of each field. In this manner, a delay number is output from the switch 84 at the beginning of each field. The delay control circuit 88 is coupled between the switch 84 and the bank of delay taps 62. The delay control circuit 88 selects a particular tap corresponding to the delay number received by the delay control circuit 88. For instance, if the delay number received by the delay control circuit 88 is −2, the delay control circuit 88 will select delay tap 0. By selecting the appropriate delay taps, the disrupted video signal $VIDEO_{IN}$ (or duplicated disrupted video signal $VIDEO_{IN}'$) received at the first input 55 of the multiple delay tap circuit 20 can be reconstructed to generate the undisrupted video signal $VIDEO_{OUT}$ at the output 56 of the multiple delay tap circuit 20 in accordance with the field sequence correction signal $S_{COR}$ generated by the field sequence generator 18. It should be noted that the bank of delay taps 62 can include more delay taps than those depicted in FIG. 1, providing the field sequence generator 18 increased flexibility in selecting a delay sequence.

It should be noted that a vertically blurred field is generated when the odd field delay taps (1-field and 3-field delay taps) are used due to the averaging of signals offset from each other by a 1 line delay. As such, it is generally undesirable to generate a delay sequence with an odd number. This undesirable effect, however, will only occur in a minimum number of fields, generally at the beginning and/or the end of a scene.

Figure 4:
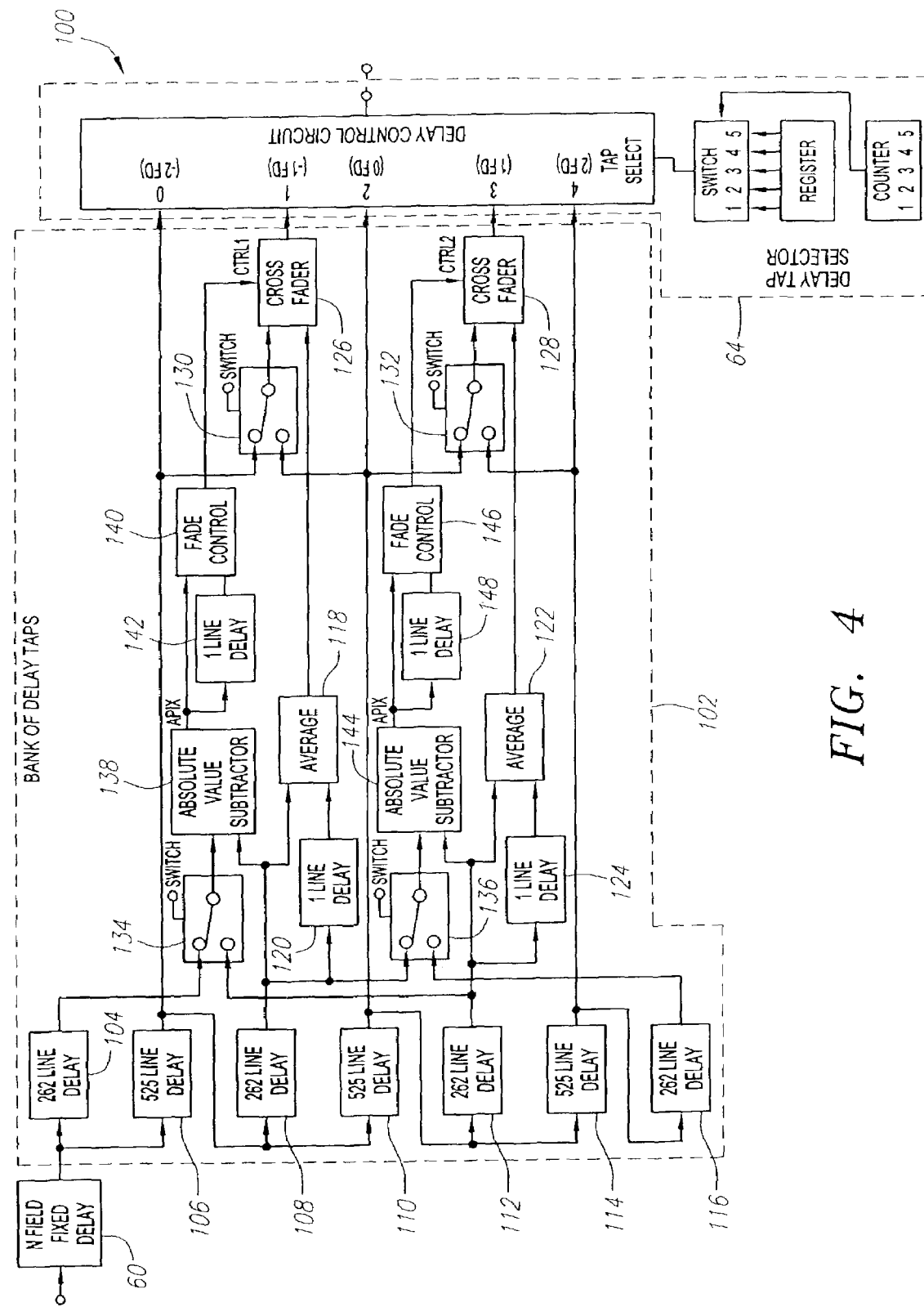
FIG. 4 is a block diagram of a compensatory multiple delay tap circuit, which can be employed in the 2-3 field pattern fixer of FIG. 1.

The resultant blurred field may be minimized or eliminated by deriving at least a portion of the field from a field that is delayed an even number of fields, by employing the multiple delay tap circuit 100 depicted in FIG. 4, instead of the multiple delay tap circuit 20 depicted in FIG. 1. The multiple delay tap circuit 100 includes a compensating bank of delay taps 102, along with the fixed delay 60 and the delay tap selector 64. As with the bank of delay taps 62, delay taps 0, 2 and 4 represent even fields of delay (i.e., relative delays of −2, 0 and 2 fields). Delay tap 0 (relative delay of −2 fields) is generated by connecting a 525-line delay 106 between the fixed delay 60 and the delay control circuit 88. Delay tap 2 (relative delay of 0 fields) is generated by connecting the 525-line delay 106 and a 525-line delay 110 between the fixed delay 60 and the delay control circuit 88. Delay tap 4 is generated by connecting the 525-line delays 106 and 110 and a 525-line delay 114 between the fixed delay 60 and the delay control circuit 88.

The bank of delay taps 102 are compensating in that delay tap 1 can be cross-faded between a first odd-delayed field, i.e., field with a relative delay of −1 field (−1FD), and one of the two even-delayed fields immediately adjacent the first odd-delayed field, i.e., a field with a relative delay of −2 fields or 0 fields (2FD or 0FD); and delay tap 3 can be cross-faded between a second odd-delayed field, i.e., a field having a relative delay of 1 field (1FD), and one of the two even-delayed fields immediately adjacent the second odd-delayed field, i.e., a field having a relative delay of 0 fields or 2 fields (0FD or 2FD). In particular, as the difference in the pixel difference values ΔPIX between an odd-delayed field and one of the immediately adjacent odd-delayed fields increases, indicating increased motion, the delay taps 1 and 3 are faded to an odd field delay. On the contrary, as the difference in the pixel difference values ΔPIX between an odd-delayed field and one of the immediately adjacent odd-delayed fields decreases, indicating decreased motion, the delay taps 1 and 3 are faded to one of the immediately adjacent even-delayed fields. To ensure that there is cross-fading between an odd-delayed field and an even-delayed field within the same scene, the lesser of the two even field delays (−2FD) immediately adjacent the first odd-delayed field (−1FD), and the lesser of the two even field delays (0FD) immediately adjacent the second odd-delayed field (1FD) are selected at the beginning of the scene, and the greater of the two even field delays (0FD) immediately adjacent the first odd-delayed field (−1FD) and the greater of the two even field delays (2FD) immediately adjacent the second odd-delayed field (1FD) are selected at the end of the scene.

Cross-fading between the first odd-delayed field (−1FD) and one of the two immediately adjacent even-delayed fields (−2FD or 0FD) is accomplished through a first cross-fader 126 and associated first switch 130. In particular, the 525-line delay 106 and a 262½ line delay are connected between the fixed delay 60 and a first input of the first cross-fader 126. The 262½-line delay is created by averaging, through an averaging circuit 118, a 262-line delay 108 with the 262-line delay 108 in series with a 1-line delay 120. The 525-line delay 106 and the 525-line delay 106 in series with a 525-line delay 110 are connected between the fixed delay 60 and a second input of the first cross-fader 126 via the first switch 130.

Similarly, cross-fading between the second odd-delayed field (1D) and one of the two immediately adjacent even fields (0D or 2FD) is accomplished through a second cross-fader 128 and associated second switch 132. In particular, the 525 -line delays 106 and 110 and a 262½-line delay are connected between the fixed delay 60 and a first input of the second cross-fader 128. The 262½-line delay is created by averaging, through an averaging circuit 122, a 262-line delay 112 with the 262-line delay 112 in series with a 1-line delay 124. The 525-line delays 106 and 110, and the 525 line delays 106 and 110 in series with a 525-line delay 114 are connected between the fixed delay 60 and another input of the second cross-fader 128 via the second switch 132.

A switch signal SWITCH, preferably generated in the field sequence analyzer 16, is applied to the first switch 130 to toggle selection between one of the two even field delays (−2FD or 0FD) immediately adjacent the first odd-delayed field (−1FD). The same switch signal SWITCH is applied to the second switch 132 to toggle selection between one of the two even field delays (0D or 2FD) immediately adjacent the second odd-delayed field (1D). Thus, application of the switch signal SWITCH to the respective first and second switches 130 and 132 either outputs the lesser of the even field delays (−2FD and 0FD) to the respective first and second cross-faders 126 and 128, preferably at the beginning of the scene, or the greater of the even field delays (0D and 2FD) to the respective first and second cross-faders 126 and 128, preferably at the end of the scene. As will be described in further detail below, application of the first control signal CTRL™ to the first cross-fader 126 cross-fades between the first odd-delayed field (−1FD) and the selected immediately adjacent even field (−2FD or 0FD). Similarly, application of the second control signal CTRL2 to the second cross-fader 128 cross-fades between the second odd-delayed field (1D) and the selected immediately adjacent even field (0D or 2FD).

The first control signal CTRL1 is generated thusly. A first input of a first absolute value subtractor 138 is coupled to the 262-line delay 108 and a second input of the first absolute value subtractor 138 is coupled to the output of a third switch 134. A first input of the third switch 134 is coupled to the 262-line delay 104 and a second input of the third switch 134 is coupled to the 262-line delay 112. Thus, the first absolute value subtractor 138 compares, on a pixel-by-pixel basis, the first odd-delayed field (−1FD) with one of the fields having an odd field delay (−3FD or 1FD) immediately adjacent the first odd-delayed field (−1FD). The switch signal SWITCH is applied to the third switch 134 to select between the two immediately adjacent odd-delayed fields (−3FD or 1FD). That is, at the beginning of the scene, the lesser immediately adjacent odd-delayed field (3D) immediately adjacent the first odd-delayed field (−1FD) is selected. At the end of the scene, the greater immediately adjacent odd-delayed field (1FD) is selected. The first absolute value subtractor 138 calculates the absolute difference between the pixels of the first odd-delayed field (−1FD) and the selected immediately adjacent odd-delayed field (3D or 1FD), and generates an absolute pixel difference ΔPIX value in response thereto Because the determination of the motion within the immediately adjacent even-delayed field (−2FD or 0FD) is pertinent to whether the first cross-fader 126 fades to the selected immediately adjacent even-delayed field (−2FD or 0FD), the absolute pixel difference value ΔPIX is preferably further processed to provide a more accurate estimate of the motion within the selected immediately adjacent even-delayed field (−2FD or 0FD). Thus, a first input of a first fade control 140 is directly coupled to the output of the first absolute value subtractor 138, and a second input of the first fade control 140 is coupled to the output of the absolute value subtractor 138 via a 1-line delay 142.

The first fade control 140 averages, or alternatively, adds the absolute pixel difference value ΔPIX with the absolute pixel difference value ΔPIX delayed by 1-line. Alternatively, the fade control 140 selects the maximum of the absolute pixel difference value ΔPIX and the absolute pixel difference value ΔPIX delayed by 1-line, so that the first cross-fader 126 conservatively fades to the selected immediately adjacent even field delay (−2FD or 0FD). The fade control 140 generates the first control signal CTRL1, which is input into the first cross-fader 126. As the amplitude of the first control signal CTRL1 decreases, the further the first cross-fader 126 fades to the selected immediately adjacent even-delayed field (−2FD or 0FD), and as the amplitude of the first control signal CTRL1 increases, the further the first cross-fader 126 fades to the first odd-delayed field (−1FD).

The second control signal CTRL2 is generated thusly. A first input of a second absolute value subtractor 144 is coupled to the 262-line delay 112 and a second input of the second absolute value subtractor 144 is coupled to the output of a fourth switch 136. A first input of the fourth switch 136 is coupled to the 262-line delay 108 and a second input of the fourth switch 136 is coupled to a 262-line delay 116. Thus, the second absolute value subtractor 144 compares, on a pixel-by-pixel basis, the second odd-delayed field (1D) with one of the odd-delayed fields (−1FD or 3FD) immediately adjacent the second odd-delayed field (1D). The switch signal SWITCH is applied to the fourth switch 136 to select between the two immediately adjacent odd-delayed fields (−1FD or 3FD). That is, at the beginning of the scene, the lesser delayed immediately adjacent odd field (−1FD) is selected, and at the end of the scene, the greater immediately adjacent odd-delayed field (3D) is selected. The second absolute value subtractor 144 calculates the absolute difference between the pixels of the second odd-delayed field (1D) and the selected immediately adjacent odd field (−3FD or 1FD), and generates an absolute pixel difference ΔPIX value in response thereto. Because the determination of the motion within the immediately adjacent even-delayed field (0D or 2FD) is pertinent to whether the second cross-fader 128 fades to the selected immediately adjacent even-delayed field (0D or 2FD), the absolute pixel difference value ΔPIX is preferably further processed to provide a more accurate estimate of the motion within the selected immediately adjacent even-delayed field (0D or 2FD). Thus, a first input of a second fade control 146 is directly coupled to the output of the second absolute value subtractor 144, and a second input of the second fade control 146 is coupled to the output of the second absolute value subtractor 144 via a 1-line delay 148.

The second fade control 146 averages, or alternatively, adds the absolute pixel difference value ΔPIX with the absolute pixel difference value ΔPIX delayed by 1-line. Alternatively, the second fade control 146 selects the maximum of the absolute pixel difference value ΔPIX and the absolute pixel difference value ΔPIX delayed by 1-line, so that the first cross-fader 126 conservatively fades to the selected immediately adjacent even-delayed field (−0FD or 2FD). The second fade control 146 generates the second control signal CTRL2, which is input into the second cross-fader 128. As the amplitude of the second control signal CTRL2 decreases, the further the second cross-fader 128 fades to the selected immediately adjacent even-delayed field (0D or 2FD), and as the amplitude of the second control signal CTRL2 increases, the further the second cross-fader 128 fades to the second odd-delayed field (1D).

The 2-3 field pattern fixer 10 can be selectively operated in the one-pass mode or the two-pass mode. Operation of the 2-3 field pattern fixer 10 in the two-pass mode is described as follows. During the first pass, the disrupted video signal $VIDEO_{IN}$ is serially received at the input 22 of the field sequence detector 12 where the fields of the discontinuous 2-3 field sequence are sequentially detected and compared to the fields two fields previous. The field sequence detector 12 generates and outputs field difference values ΔFD at the output 32 in response to these comparisons. The time code/field difference encoder 40 encodes the current time codes $TC_{CUR}$ and the corresponding field difference values ΔFD into a series of character strings $CDE_{ANL}$, which are stored in the FIFO 42 for subsequent analysis by the field sequence analyzer 16. During the first pass, the trigger signals $S_{TR}$ are either not encoded into the character strings $CDE_{ANL}$ or ignored by the field sequence analyzer 16.

The field sequence analyzer 16 receives the series of character strings $CDE_{ANL}$ at the input port 44, and then decodes and analyzes the series of field difference values ΔFD to determine a discontinuity of the discontinuous 2-3 field sequence, and in particular, the first field of the scene change and phase change of the discontinuous 2-3 sequence. Because the undisrupted video signal $VIDEO_{OUT}$ is not generated until the second pass in the two-pass mode, the field sequence analyzer 16 can analyze the entire scene to facilitate the determination of the first field of the scene change and the phase change of the discontinuous 2-3 field sequence. This capability becomes significant when the beginning of the scene has no or very little motion making it sometimes difficult to distinguish between a third field of a distinct three-field sequence 3FS and the other fields until later in the scene. Thus, although the beginning of the scene may not be determined until much later in the scene, the second pass allows the correction signal $S_{COR}$ to be timely applied to the duplicated disrupted video signal VIDEO$_{IN}$' at the beginning of the scene. The field sequence generator 18 then generates reorganization information in response to this information. In particular, the field sequence generator 18 generates the field sequence correction signal $S_{COR}$ and the corresponding trigger time code $TC_{TR}$. This information is logged into the log 48. Several scenes can be analyzed, and thus, several correction signals $S_{COR}$ and corresponding trigger time codes $T_{CTR}$ can be logged into the log prior to the second pass.

The reorganization of the fields of the discontinuous 2-3 field sequence into the fields of the continuous field sequence typically results in continuous 2-3 field sequence that is distorted in time, causing the resulting video signal and the corresponding audio signal, which is not distorted in time, to be out of synchronization. This will typically not create a problem when the respective video and audio signals are unsynchronized by a minimal amount of fields, which may result from a delay through a single scene change. For example, edit point EP depicted in FIG. 2 causes a 1 field delay for the film frames represented in the first continuous 2-3 field sequence (e.g., the partial sequence O2/O1 in the first continuous 2-3 field sequence is one field delayed from the partial sequence O1/O2 in the discontinuous 2-3 field sequence) and a –1/1;20 field delay for the film frames represented in the second continuous 2-3 field sequence (e.g., the partial sequence O1/O2/O1 in the second continuous 2-3 field sequence is –1/1;20 field delayed from the partial sequence O1/O2 in the discontinuous 2-3 field sequence).

These delays are relatively minimal. If left unchecked, however, the cumulative field delay through a series of scene changes could be relatively great, resulting in the de-synchronization of the respective video and audio signals. As such, for each scene change, the field sequence generator 18 selects a particular delay sequence that would minimize the cumulative field delay, or at least maintain the cumulative field delay within a certain range. Typically, this delay range will include values of –2, –1½, –1, –½, 0, +½, +1, +1½, +2. The delay range, however, can be greater or less, depending on the tolerance of the delay between the respective video and audio signals Also, in selecting particular delay sequences, the field sequence generator 18 preferably discards disjoined single field frames, such that the resulting delay sequence does not include an odd field delay. For example, the M1 field depicted in FIG. 2 is discarded in generating the second continuous 2-3 field sequence. Thus, in selecting particular field delay sequences, the field sequence generator 18 attempts to maintain the cumulative field delay within a defined range, while discarding as many disjoined single field frames as possible. In the two-pass mode, several scenes can be analyzed at a time, thereby allowing a more efficient selection of the delay sequences. In the one-pass mode, the field sequence generator 18 must determine the delay sequence as each scene is analyzed, and therefore must determine whether a disjoined single field frame should be discarded based on the cumulative field delay at that point. Preferably, while in the one-pass mode, the cumulative field delay is maintained on the positive side of the range to allow the field sequence generator 18 more flexibility in discarding single field frames. Of course, under certain circumstances, whether in the two-pass mode or the one-pass mode, the cumulative field delay becomes too negative if every disjoined single field frame is discarded.

For example, if the cumulative field delay is negative, such as, e.g., –2 fields, and the tolerance level of the delay between the respective video and audio signals is low, the field sequence generator 18 may select the delay sequence used to generate the first continuous 2-3 field sequence in FIG. 2, so that the absolute cumulative field delay is lessened by 1 field. Although this results in the blurring of the M2 field, selection of the delay sequence used to generate the second continuous 2-3 field sequence would have increased the absolute cumulative field delay by 1½ fields to a cumulative total of –3½ fields, which may produce a result more undesirable than that produced by selection of the delay sequence used to generate the first continuous 2-3 field sequence.

Thus, under certain circumstances, the field sequence generator 18 must select between which of the disjoined single field frames to discard. This selection process is preferably based on detected motion between the disjoined single field frame and the immediately adjacent frame (subsequent frame if at the beginning of the scene, and preceding frame if at the end of the scene), which can be obtained from the field difference values $\Delta FD$ analyzed by the field sequence analyzer 16. In the case where the basic bank of delay taps 62 is employed, the disjoined single field frames in which there is detected relatively little motion are preferably discarded before those in which there is detected relatively great motion. This is because the vertical blurring will not be as noticeable to the viewer when there is a lot of motion in the vertically blurred frame. In the case where the compensating bank of delay taps 102 is employed, the disjoined single field frames in which there is detected relatively great motion are preferably discarded before those in which there is detected relatively great motion. This is because the compensating bank of delay taps 102 cannot compensate for vertically blurred frames that have relatively a large amount of motion.

During the second pass, a duplicated disrupted video signal VIDEO$_{IN}$' is received at the first input 55 of the multiple delay tap circuit 20. At the same time or prior thereto, the field sequence generator 18 encodes the multitude of correction signals $S_{COR}$ and corresponding trigger time codes TC$_{TR}$ received from the log 48 into a corresponding multitude of control character strings CDE$_{CTRL}$. These control character strings CDE$_{CTRL}$ are then output at the output port 46 into the FIFO 50. The first control character string CDE$_{CTRL}$ is advanced into and decoded by the time code/correction signal decoder 52, which then transmits the field sequence correction signal $S_{COR}$ to the delay tap selector 64 and the trigger time code TC$_{TR}$ to the second input 36 of the time code comparator 14. The current time code TC$_{CUR}$' of the duplicated disrupted video signal VIDEO$_{IN}$' is input into the first input 34 of the time code comparator 14. The current time code TC$_{CUR}$' and the trigger signals S$_{TR}$ are encoded by the time code/field difference encoder 40 into a series of character strings CDE$_{ANL}$ for use by the PC to provide the user status. During the second pass, field difference values $\Delta FD$ are either not encoded into the character strings CDE$_{ANL}$ or ignored by the field sequence analyzer 16.

The field sequence correction signal $S_{COR}$ is not applied to the duplicated disrupted video signal VIDEO$_{IN}$' until the current time code TC$_{CUR}$' of the duplicated disrupted video signal VIDEO$_{IN}$' matches the trigger time code TC$_{TR}$. In this connection, the time code comparator 14 compares the current time code TC$_{CUR}$' to the trigger time code TC$_{TR}$ and generates the trigger signal S$_{TR}$ in response thereto. The trigger signal S$_{TR}$ is input into the FIFO 50 and the register 82 and counter 86 of the multiple delay tap circuit 20. If the current time code $TC_{CUR}'$ is less than the trigger time code $TC_{TR}$, the first bit of the two bit trigger signal $S_{TR}$ is low. In this case, the FIFO 50 is not advanced, the register does not save the field sequence correction signal $S_{COR}$, and the counter is not reset to "1".

If the current time code $TC_{CUR}$ is equal to the trigger time code $TC_{TR}$, the first bit of the two bit trigger signal $S_{TR}$ is high. In this case, the register 82 of the multiple delay tap circuit 20 saves the field sequence correction signal $S_{COR}$, and the counter 86 is reset to "1". The field sequence correction signal $S_{COR}$ is output from the register 82 to the switch 84. With the counter 86 set at "1", the first delay number is sent to the delay control circuit 88, which selects the delay tap within the bank of delay taps 62 in accordance with the delay number. The FIFO 50 is advanced, transmitting the next control character string $CDE_{CTRL}$ to the time code/correction signal decoder 52, which decodes and transmits the next field sequence correction signal $S_{COR}$ to the multiple delay tap circuit 20 and the next trigger time code $TC_{TR}$ to the second input 36 of the time code comparator 14.

Until the current time code $TC_{CUR}$ matches the next trigger time code $TC_{TR}$, the current field sequence correction signal $S_{COR}$ is applied to the duplicated disrupted video signal $VIDEO_{IN}'$, with the counter 86 counting from 1 to 5. In this manner, the delay numbers of the current field sequence correction signal $S_{COR}$ are sequentially sent to the delay control circuit 88, thereby sequentially delaying the selected fields of the duplicated disrupted video signal $VIDEO_{IN}'$ to generate the undisrupted video signal $VIDEO_{OUT}$ at the output 56. Thus, the correction signal $S_{COR}$ is applied to the duplicated disrupted video signal $VIDEO_{IN}'$ in real time, i.e., at a field rate equal to the field rate of the disrupted video signal $VIDEO_{IN}$.

Application of the delay numbers −2, −1, 0, 1 and 2 to the delay control circuit 88 prompts respective selection of the corresponding delay taps 0, 1, 2, 3 and 4, and thus selection of a distinct field of the duplicated disrupted video signal $VIDEO_{IN}'$ that has a delay corresponding to the current delay number. If the compensating bank of delay taps 102 depicted in FIG. 4 are used, selection of the fields of the duplicated disrupted video signal $VIDEO_{IN}'$ that have been delayed an odd number of fields are not distinct, but are rather cross-faded with an immediately adjacent field. In particular, application of an odd delay number to the delay control circuit 88 prompts selection of the corresponding odd delay tap, and thus selection of the corresponding odd-delayed field and one of the immediately adjacent even-delayed fields. At the same time that the odd delay number is applied to the delay control circuit 88, the switch signal SWITCH is sent from the field sequence analyzer 16 to the first, second, third and fourth switches 130, 132, 134 and 136 to select the particular even-delayed field to and from which the odd-delayed field is cross-faded. Thus, if at the beginning of the scene, the switch signal SWITCH causes the switches 130, 132, 134 and 136 to switch down to select the greater of the immediately adjacent even-delayed fields (0D and 2FD). If at the end of the scene, the switch signal SWITCH causes the switches 130, 132, 134 and 136 to switch up to select the lesser of the immediately adjacent even-delayed fields (2D and 0FD).

For instance, if delay tap 1 is selected and the switches 130 and 134 are switched down, the first odd-delayed field (−1FD) and the greater immediately adjacent even field delay (0D) are cross-faded. The first absolute value subtractor 138 compares the pixels of the first odd-delayed field (−1FD) with the pixels of the greater immediately adjacent odd-delayed field (1D), generating the pixel difference value ΔPIX. The pixel difference value ΔPIX is processed through the first fade control 140, generating the first control signal CTRL1, which is applied to the first cross-fader 126. The first cross-fader 126 then cross-fades between the first odd-delayed field (−1FD) and the greater immediately adjacent even-delayed field (0D) in accordance with the first control signal CTRL1. If the switches 130 and 134 are switched up, the first odd-delayed field (−1FD) and the lesser immediately adjacent even-delayed field (−2FD) are cross-faded. The first absolute value subtractor 138 compares the pixels of the first odd-delayed field (−1FD) with the pixels of the lesser immediately adjacent odd-delayed field (−3FD), generating the pixel difference value ΔPIX. The pixel difference value ΔPIX is processed through the first fade control 140, generating the first control signal CTRL1, which is applied to the first cross-fader 126. The first cross fader 126 then cross-fades between the first odd-delayed field (−1FD) and the lesser immediately adjacent even-delayed field (−2FD) in accordance with the first control signal CTRL1.

In a similar manner, if delay tap 3 is selected and the switches 132 and 136 are switched down, the second odd-delayed field (1D) and the greater immediately adjacent even-delayed field (2D) are cross-faded. If the switches 132 and 136 are switched up, the second odd-delayed field (1D) and the lesser immediately adjacent even-delayed field (0D) are cross-faded.

Referring back to FIG. 1, when the current time code $TC_{CUR}$ does match the next trigger time code $T_{CTR}$, the first bit of the two bit trigger signal $S_{TR}$ again is high, thereby saving the next field sequence correction signal $S_{COR}$ in the register 82 and clearing the counter 86 to apply the next field sequence correction signal $S_{COR}$ to the duplicated disrupted video signal $VIDEO_{IN}'$. The FIFO 50 is advanced to input the next control character string $CDE_{CTRL}$ into the time code/correction signal decoder 52 for transmission of the next field sequence correction signal $S_{COR}$ to the multiple delay tap circuit 20 and next trigger time code $T_{CTR}$ to the time code comparator 14. This process is repeated until the last field sequence correction signal $S_{COR}$ has been applied to the duplicated disrupted video signal $VIDEO_{IN}'$.

Operation of the 2-3 field pattern fixer 10 in the one-pass mode is described as follows. The disrupted video signal $VIDEO_{IN}$ is serially received at the input 22 of the field sequence detector 12 and the first input 55 of the multiple delay tap circuit 20. The field sequence detector 12 sequentially detects the fields of the discontinuous 2-3 field sequence and compares these fields to the fields two fields previous. The field sequence detector 12 generates and outputs field difference values ΔFD at the output 32 in response to these comparisons. The time code/field difference encoder 40 encodes the current time codes $TC_{CUR}$, the corresponding field difference values ΔFD, and the trigger signals $S_{TR}$ from the time code comparator 14 into a series of character strings $CDE_{ANL}$, which are stored in the FIFO 42 for subsequent analysis by the field sequence analyzer 16. When the 2-3 field pattern fixer 10 is in the one-pass mode, the trigger signals $S_{TR}$ are either not encoded in the character strings $CDE_{ANL}$ or are ignored by the field sequence analyzer 16.

The field sequence analyzer 16 receives the series of character strings $CDE_{ANL}$ at the input port 44, and then decodes and analyzes the series of field difference values ΔFD to determine a discontinuity of the discontinuous 2-3 field sequence, and in particular, the first field of the scene change and phase change of the discontinuous 2-3 field sequence. The field sequence generator 18 then generates reorganization information in response to this information. In particular, the field sequence generator 18 generates the field sequence correction signal $S_{COR}$. A corresponding trigger time code $TC_{TR}$ is not generated, since the field sequence correction signal $S_{COR}$ must be applied to the disrupted video signal $VIDEO_{IN}$ as it is generated. The fixed delay 60 in the multiple delay tap circuit 20 is long enough to allow the sequence analyzer 16 and field sequence generator 18 to analyze the series of field difference values $\Delta FD$ and generate the field sequence correction signal $S_{COR}$ in time to apply the field sequence correction signal $S_{COR}$ to the selected fields of the disrupted video signal $VIDEO_{IN}$. If the disrupted video signal $VIDEO_{IN}$ originates from a digital recording, the identity or near identity of the first and third fields of each distinct three field sequence 3FS should allow the field sequence analyzer 16 to determine the discontinuity of the discontinuous 2-3 field sequence quickly, even if there is no or very little motion within the scene.

The field sequence generator 18 encodes the field sequence correction signal $S_{COR}$ into a control character string $CDE_{CTRL}$, which is then output at the output port 46 into the FIFO 50. The control character string $CDE_{CTRL}$ is advanced into and decoded by the time code/correction signal decoder 52, which then transmits the field sequence correction signal $S_{COR}$ to the multiple delay tap circuit 20, where it is applied to the disrupted video signal $VIDEO_{IN}$. In this connection, the register 82 of the multiple delay tap circuit 20 saves the field sequence correction signal $S_{COR}$, and the counter 86 is reset to "1" upon the receipt of a trigger signal, which may be generated in the PC or timing circuitry. The field sequence correction signal $S_{COR}$ is output from the register 82 to the switch 84. With the counter 86 set at "1", the first delay number is sent to the delay control circuit 88, which selects the delay tap within the bank of delay taps 62 in accordance with the delay number. Until the field sequence generator 18 generates another field sequence correction signal $S_{COR}$, the current field sequence correction signal $S_{COR}$ is applied to the duplicated disrupted video signal $VIDEO_{IN}'$, with the counter 86 counting from 1 to 5. In this manner, the delay numbers of the current field sequence correction signal $S_{COR}$ are sequentially sent to the delay control circuit 88, thereby sequentially delaying the selected fields of the disrupted video signal $VIDEO_{IN}$ to generate the undisrupted video signal $VIDEO_{OUT}$ at the output 56. Thus, the correction signal $S_{COR}$ is applied to the disrupted video signal $VIDEO_{IN}$ in real time, i.e., at a field rate equal to the field rate of the disrupted video signal $VIDEO_{IN}$.

It should be noted that although the 2-3 field pattern fixer 10 is shown as being selectively operated in a one-pass mode and a two-pass mode, it will be readily apparent to those skilled in the art that a 2-3 field pattern fixer that is able to operate in only one of the modes can be constructed without straying from the principles taught by this invention. For example, a 2-3 field sequence fixer that only operates in a one-pass mode obviates the need for circuitry that is otherwise required for the 2-3 field sequence fixer to operate in the two-pass mode. Furthermore, operation of the 2-3 field sequence fixer solely in the one-pass lends itself to a strict hardware implementation of the 2-3 field sequence fixer, eliminating the need for a PC. In this connection, the field sequencer 16 and field sequence generator 18 can be implemented in hardware, and the timecode comparator 14, timecode/field difference encoder 40, FIFO's 42 and 50, timecode/correction signal decoder 52 and reset decoder 54 can be eliminated. In this case, the field difference value $\Delta FD$ can be input directly into the field sequence analyzer 16 and the field sequence correction signal $S_{COR}$ can be output directly from the field sequence generator 18.

While preferred methods and embodiments have been shown and described, it will be apparent to one of ordinary skill in the art that numerous alterations may be made without departing from the spirit or scope of the invention. Therefore, the invention is not to be limited except in accordance with the following claims.

What is claimed:

1. A method of generating an undisrupted video signal comprising a series of fields arranged in a continuous 2-3 field sequence, the method comprising:
   receiving a disrupted video signal, the disrupted video signal comprising a series of fields arranged in a discontinuous 2-3 field sequence;
   analyzing the discontinuous 2-3 field sequence of the disrupted video signal to determine a discontinuity;
   generating a correction signal based on the determined discontinuity, the correction signal minimizing the cumulative delay within the undisrupted video signal; and
   generating the undisrupted video signal by applying the correction signal to a video signal.

2. The method of claim 1, wherein the undisrupted video signal is generated by rearranging the series of fields in one of the disrupted video signal and a duplicate of the disrupted video signal in accordance with the correction signal.

3. The method of claim 1, wherein the correction signal is applied to the disrupted video signal.

4. The method of claim 3, wherein the received disrupted video signal is delayed at least an amount of time required to generate the correction signal.

5. The method of claim 3, wherein the correction signal is applied to the video signal as the correction signal is generated.

6. The method of claim 1, wherein the correction signal is applied to a duplicate of the disrupted video signal.

7. The method of claim 6, further comprising:
   determining a plurality of discontinuities in the discontinuous 2-3 field sequence;
   determining a first plurality of time codes within the disrupted video signal, the first plurality of time codes respectively associated with the plurality of discontinuities;
   generating a plurality of correction signals respectively based on the plurality of discontinuities;
   receiving the duplicated disrupted video signal;
   determining a second plurality of time codes within the duplicated disrupted video signal, the second plurality of time codes corresponding with the first plurality of time codes; and
   generating the undisrupted video signal by sequentially applying the plurality of correction signals to the duplicated disrupted video signal as the corresponding second plurality of time codes are determined.

8. The method of claim 1, wherein the correction signal is generated by selecting a series of delays, each delay applied to one field of either the disrupted video signal or a duplicate of the disrupted video signal.

9. The method of claim 8, wherein a cumulative field delay is generated within the undisrupted video signal, and wherein selection of the series of delays is based on a minimization of the cumulative field delay.

10. The method of claim 9, wherein the disrupted video signal includes a plurality of disjoined single field frames, and wherein selection of the series of delays is based on discarding of the disjoined single field frames.

11. The method of claim 10, wherein the discarding of disjoined single field frames are based on a relative motion detected within the disjoined single field frames.

12. The method of claim 11, wherein the disjoined single field frames having a relatively great motion are discarded.

13. The method of claim 11, wherein the disjoined single field frames having relatively little motion are discarded.

14. The method of claim 1, wherein an edit point and a phase change within the discontinuous 2-3 field sequence are determined, and the generation of the correction signal is based on the detected phase change and edit point.

15. The method of claim 14, wherein the edit point and a phase of the discontinuous 2-3 field sequence are determined by sequentially comparing fields twice removed in sequence.

16. The method of claim 1, wherein a plurality of correction signals are generated and sequentially applied to the video signal.

17. The method of claim 1, wherein the application of the plurality of correction signals to the video signal generates a cumulative field delay between the discontinuous 2-3 field sequence of the disrupted video signal and the continuous 2-3 field sequence of the undisrupted video signal, and wherein the plurality of correction signals are generated, such that the cumulative field delay is maintained within a range of selected values.

18. A method of correcting a disrupted video signal comprising a series of fields arranged in a discontinuous 2-3 field sequence, the method comprising:
receiving the disrupted video signal;
analyzing the discontinuous 2-3 field sequence of the disrupted video signal to determine a discontinuity;
generating a correction signal based on the determined discontinuity; and
generating the undisrupted video signal by applying the correction signal to a video signal at a field rate equal to the field rate of the disrupted video signal, wherein the undisrupted video signal comprises a series of fields arranged in a continuous 2-3 field sequence.

19. The method of claim 18, wherein the undisrupted video signal is generated by rearranging the series of fields in either the disrupted video signal or the duplicate of the disrupted video signal in accordance with the correction signal.

20. The method of claim 18, wherein the correction signal is applied to the disrupted video signal.

21. The method of claim 18, wherein the correction signal is applied to a duplicate of the disrupted video signal.

22. The method of claim 21, further comprising:
determining a plurality of discontinuities in the discontinuous 2-3 field sequence;
detecting a first plurality of time codes within the disrupted video signal, the first plurality of time codes respectively associated with the plurality of discontinuities;
generating a plurality of correction signals respectively based on the plurality of discontinuities;
receiving the duplicated disrupted video signal;
detecting a second plurality of time codes within the duplicated disrupted video signal, the second plurality of time codes corresponding with the first plurality of time codes; and
generating the undisrupted video signal by sequentially applying the plurality of correction signals to the duplicated disrupted video signal as the corresponding second plurality of time codes are detected, each of the correction signals being applied to the duplicated disrupted video signal at a field rate equal to a field rate of the disrupted video signal.

23. The method of claim 18, wherein an edit point and a phase change within the discontinuous 2-3 field sequence are determined, and the generation of the correction signal is based on the detected phase change and edit point.

24. The method of claim 18, wherein a plurality of correction signals are generated and sequentially applied to the video signal, each of the correction signals being applied to the duplicated disrupted video signal at a field rate equal to a field rate of the disrupted video signal.

25. A 2-3 field pattern fixer, comprising:
a field sequence detector configured for receiving a disrupted video signal having a discontinuous 2-3 field sequence and generating a series of field difference values;
a field sequence analyzer having an input coupled to an output of the field sequence detector and being configured for generating field sequence information based on the series of field difference values;
a field sequence generator having an input coupled to an output of the field sequence analyzer and being configured for generating a sequence of delay numbers based on the field sequence information; and
a multiple delay tap circuit having an input coupled to an output of the field sequence generator and being configured for receiving a video signal and for applying the sequence of delay numbers thereto to generate an undisrupted video signal having a continuous 2-3 field sequence, wherein the undisrupted video signal comprises a series of fields arranged in a continuous 2-3 field sequence.

26. The 2-3 field pattern fixer of claim 25, wherein the field sequence analyzer and the field sequence generator are embodied in a computer.

27. The 2-3 field pattern fixer of claim 25,
wherein one of the field sequence generator and field sequence analyzer is further configured to receive a current time code of the disrupted video signal and generate a trigger time code in response thereto;
wherein the 2-3 field pattern fixer further comprises a time code comparator having an first input coupled to an output of the one of the field sequence generator and field sequence analyzer and a second input for receiving a current time code of the duplicated disrupted video signal, the time code comparator configured for generating a trigger signal; and
wherein the multiple delay tap circuit includes a second input coupled to an output of the time code comparator, and configured for initially applying the sequence of delay numbers to a duplicated of the disrupted video signal when the trigger signal equals a selected value.

28. The 2-3 field pattern fixer of claim 27, further comprising a First-In-First-Out (FIFO) memory device coupled between the field sequence generator and the multiple delay tap circuit; and
wherein the field sequence generator is configured for generating and storing a series of correction signals within the FIFO.

29. The 2-3 field pattern fixer of claim 25, wherein the 2-3 field pattern fixer can be selectively operated in a one-pass mode and a two-pass mode.

30. The 2-3 field pattern fixer of claim 25, wherein the multiple delay tap circuit is implemented using RAM addressing circuitry.

31. The 2-3 field pattern fixer of claim 25, wherein the multiple delay tap circuit comprises a bank of delay taps, and a delay tap selector coupled to the bank of delay taps for selecting one of the delay taps.

32. The 2-3 field pattern fixer of claim 25, wherein the bank of delay taps comprises an odd delay tap with a cross-fader.

33. A method of generating an undisrupted video signal comprising a series of fields arranged in a continuous 2-3 field sequence, the method comprising:
   receiving a disrupted video signal, the disrupted video signal comprising a series of fields arranged in a discontinuous 2-3 field sequence;
   analyzing the discontinuous 2-3 field sequence of the disrupted video signal to determine a discontinuity within the discontinuous 2-3 field sequence;
   selecting a series of field delays based on the determined discontinuity;
   applying each field delay to one field of either the disrupted video signal or a duplicate of the disrupted video signal to generate the undisrupted video signal, wherein a field is delayed an odd number of fields and wherein the cumulative delay within the undisrupted video signal is minimized; and
   cross-fading between the odd-delayed field and another field to generate a field within the disrupted video signal.

34. The method of claim 33, wherein the cross-fading is between the odd-delayed field and an even-delayed field.

35. The method of claim 34, wherein the odd-delayed field is at the beginning of a scene, and wherein the cross-fading is between the odd-delayed field and an even-delayed field immediately subsequent to the odd-delayed field.

36. The method of claim 34, wherein the odd-delayed field is at the end of a scene, and wherein the cross-fading is between the odd-delayed field and an even-delayed field immediately preceding the odd-delayed field.

37. The method of claim 34, further comprising determining an absolute pixel difference between the odd-delayed field and an immediately adjacent odd-delayed field, and wherein the odd-delayed field is faded to if the absolute pixel difference is relative large and the odd-delayed field is faded from if the absolute pixel difference is relatively small.

38. The method of claim 37, further comprising delaying the absolute pixel difference by one line and processing the absolute pixel difference and the delayed absolute pixel difference to more accurately estimate an absolute pixel difference between the odd-delayed field and an immediately adjacent even-delayed field.

* * * * *